United States Patent [19]

Funaki et al.

[11] Patent Number: 5,202,402
[45] Date of Patent: Apr. 13, 1993

[54] STYRENE COPOLYMER AND PROCESS FOR PRODUCING SAID COPOLYMER

[75] Inventors: Keisuke Funaki; Masakazu Abe; Michitake Uoi, all of Ichihara, Japan

[73] Assignee: Idemitsu Kosan Co., Ltd., Tokyo, Japan

[21] Appl. No.: 684,474

[22] Filed: Apr. 11, 1991

Related U.S. Application Data

[63] Continuation of Ser. No. 358,340, May 11, 1989, abandoned.

[30] Foreign Application Priority Data

Oct. 8, 1987 [JP] Japan .............................. 252532/1987
Oct. 8, 1987 [JP] Japan .............................. 252533/1987

[51] Int. Cl.$^5$ ........................ C08F 212/06; C08F 4/64
[52] U.S. Cl. .................................. 526/336; 526/159; 526/160; 526/165; 526/251; 526/293; 526/347; 528/481; 528/503
[58] Field of Search .............. 526/336, 347, 159, 160, 526/165, 251, 293; 528/481, 503

[56] References Cited

U.S. PATENT DOCUMENTS

| | | | |
|---|---|---|---|
| 2,989,515 | 6/1961 | Bruton et al. | 156/334 X |
| 4,192,921 | 3/1980 | Dales | 526/336 X |
| 4,680,353 | 7/1987 | Ishihara et al. | 526/160 |

FOREIGN PATENT DOCUMENTS

| | | |
|---|---|---|
| EP 0210615 | 4/1987 | European Pat. Off. . |
| 46-8988 | 3/1971 | Japan . |
| 58-35602 | 8/1983 | Japan . |
| 60-26011 | 2/1985 | Japan . |

OTHER PUBLICATIONS

Natta et al., "Stereospecific Polymerization . . . of Vinyl Aromatic Monomers", Makromol. Chemie, 28, 253 (1958).
Nielsen, Mechanical Properties of Polymers and Composites, vol. 1, Marcel Dekker, Inc., N.Y., 174–177, 180–184 (1974).

*Primary Examiner*—Fred Teskin
*Attorney, Agent, or Firm*—Oblon, Spivak, McClelland, Maier & Neustadt

[57] ABSTRACT

Styrene copolymers having a repeating unit (I) represented by the general formula:

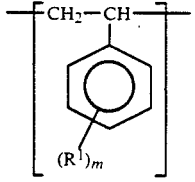

and a repeating unit (II) represented by the general formula:

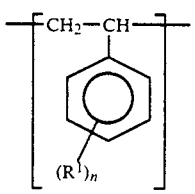

(wherein all the symbols are as defined in the appended claims), and having the stereoregularity that is mainly syndiotactic, and cross-linked styrene copolymers obtained by cross-linking the above styrene copolymers. The styrene copolymers are reactive resins (heat-sensitive resins and radiation-sensitive resins) and are excellent in heat resistance and chemical resistance. The cross-linked styrene copolymers are excellent in heat resistance, chemical resistance and mechanical strength.

18 Claims, 3 Drawing Sheets

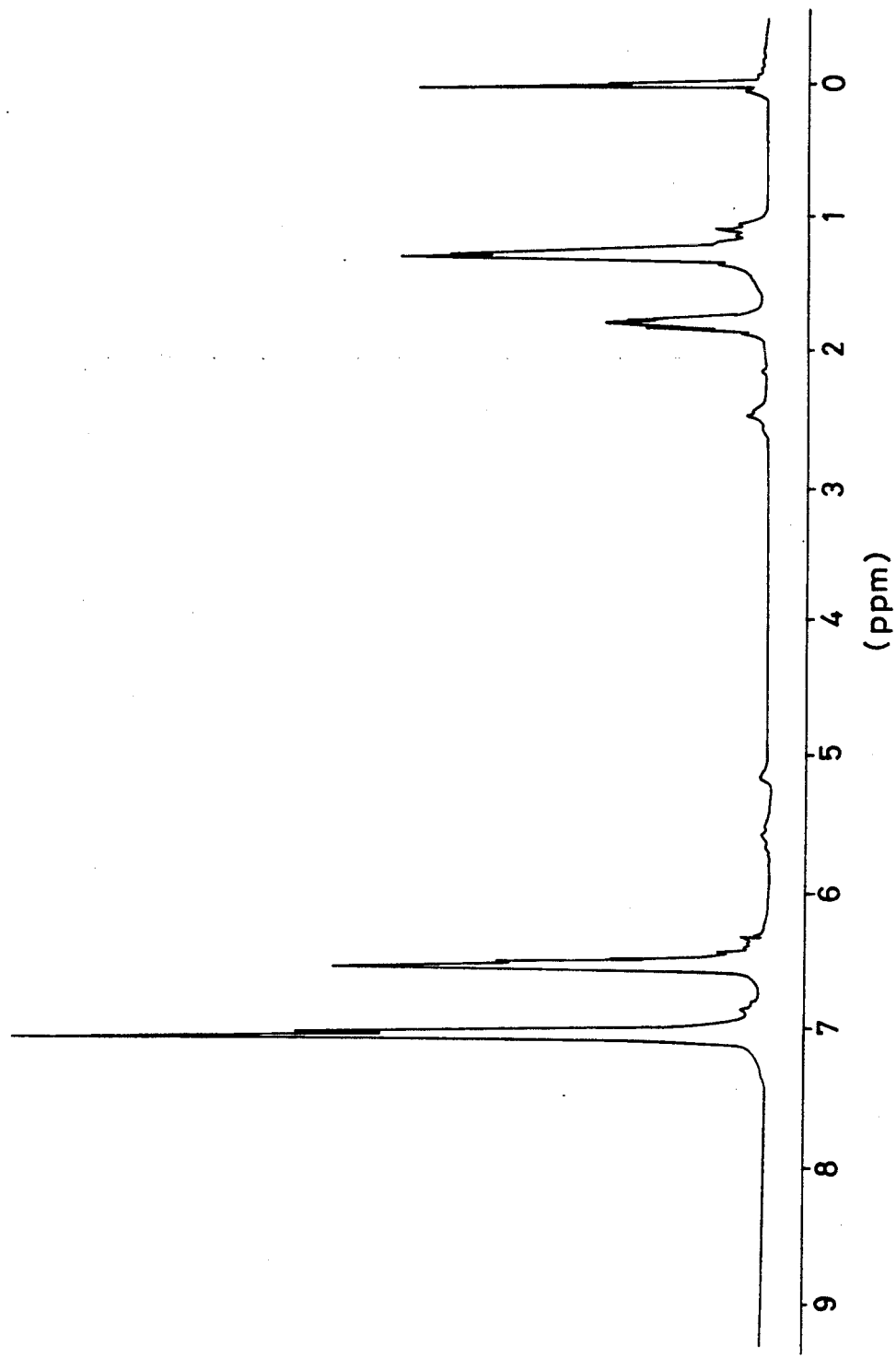

STYRENE COPOLYMER AND PROCESS FOR PRODUCING SAID COPOLYMER

This application is a continuation of application Ser. No. 07/358,340, filed May 11, 1989 (abandoned) which is the U.S. designated application of PCT/JP88/01013 filed Oct. 5, 1988.

DESCRIPTION

1. Technical Field

The present invention relates to styrene copolymers and a process for producing said copolymers. More particularly, it is concerned with novel styrene copolymers in which the stereoregularity of the copolymer chain is mainly syndiotactic, and further which have reactive substituents; novel cross-linked styrene copolymer; and a process for efficiently producing the above styrene copolymers.

2. Background Art

Heretofore, as a reactive styrene copolymer, a copolymer of styrene and divinylbenzene has been known and used as a base material for ion exchange resins and so on.

The above copolymer, however, has a disadvantage in that it undergoes the cross-linking reaction at relatively low temperatures, thereby hardening and losing its reactivity, because it has the atactic configuration. Moreover, the copolymer, even after the cross-linking reaction, is unsatisfactory in physical properties such as heat resistance, chemical resistance and so on, thus it is subject to various limitations in its practical use.

As a cross-linked styrene copolymer, a cross-linked copolymer of styrene and divinylbenzene has heretofore been known. The above copolymer, however, is unsatisfactory in physical properties such as heat resistance, chemical resistance, mechanical strength and so on, because of its atactic configuration and thus is limited in application.

Syndiotactic polystyrene as described in Japanese Patent Application Laid-Open No. 104818/1987 is known as a styrene-based polymer having excellent heat resistance, but has a disadvantage of being poor in mechanical strength.

An object of the present invention is to provide novel reactive styrene copolymers excellent in physical properties such as heat resistance, chemical resistance and so on.

Another object of the present invention is to provide novel cross-linked styrene copolymers excellent in physical properties such as heat resistance, chemical resistance, mechanical strength and so on.

Still another object of the present invention is to provide a process for efficiently producing the above novel reactive styrene copolymers and cross-linked styrene copolymers.

DISCLOSURE OF INVENTION

That is the present invention provides styrene copolymers having a repeating unit (I) represented by the general formula (a):

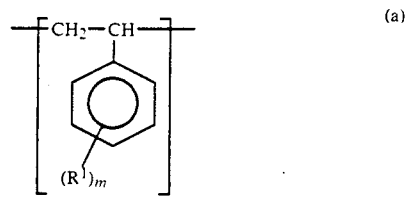

(wherein $R^1$ is a hydrogen atom, a halogen atom or a group containing; a carbon, oxygen, nitrogen, sulfur, phosphorus or silicon atom, m is an integer of 1 to 3, $R^1$s may be the same or different when m is plural) and a repeating unit (II) represented by the general formula (b):

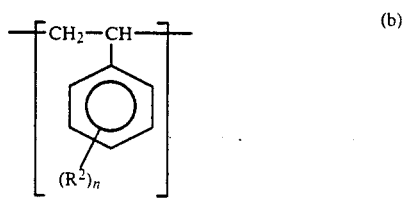

(wherein $R^2$ is an unsaturated hydrocarbon group containing a terminal vinyl group and having 2 to 10 carbon atoms, n is an integer of 1 or 2, and when n is 2, $R^2$s may be the same or different), and having the stereoregularity that is mainly syndiotactic.

The present invention also provides cross-linked styrene copolymers as obtained by cross-linking the above styrene copolymers.

The present invention further provides a process for producing the above styrene copolymers which comprises copolymerizing a styrene-based monomer (I) represented by the general formula (a'):

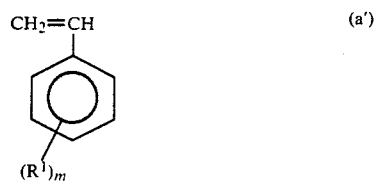

(wherein $R^2$ and m are the same as defined above) and a styrene-based monomer (II) represented by the general formula (b'):

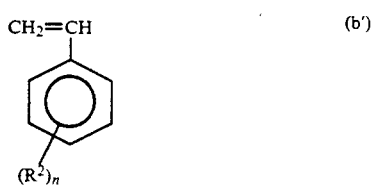

(wherein $R^2$ and n are the same as defined above) in the presence of a catalyst containing (A) titanium compound and (B) aluminoxane as main components.

The present invention further provides a process for producing the above cross-linked styrene copolymers which comprises cross-linking the above styrene copolymers.

The styrene-based copolymers of the present invention are superior to the conventional reactive resins in heat resistance and chemical resistance, and the cross-linked styrene copolymers of the present invention are superior to the conventional cross-linked resins in heat resistance, chemical resistance and mechanical strength.

BRIEF DESCRIPTION OF DRAWINGS

FIG. 2 is a $^1$H-NMR spectrum of the styrene copolymer (not cross-linked) obtained in Example 2.

BEST MODE FOR CARRYING OUT THE INVENTION

Figure 1A:
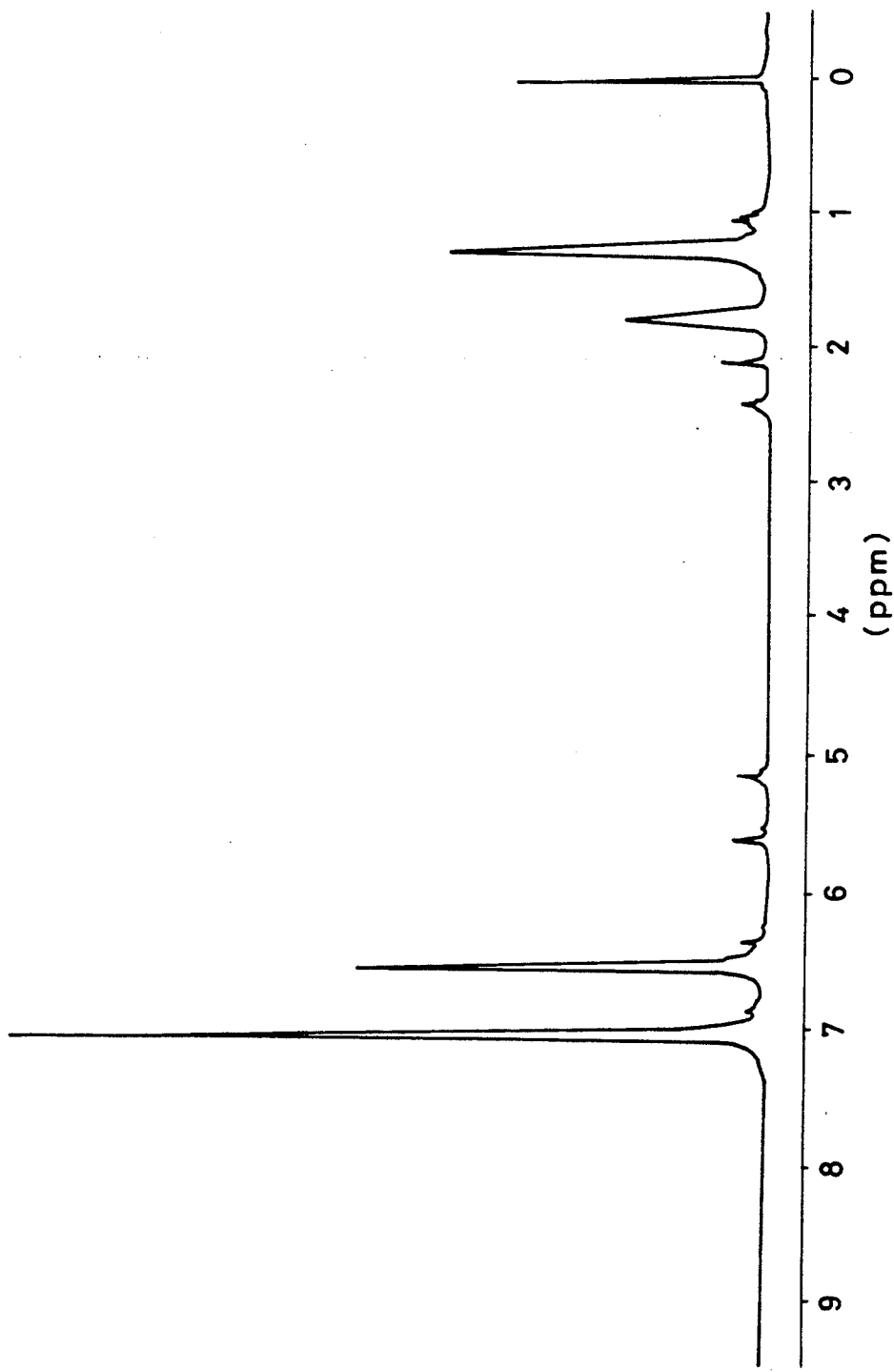
FIG. 1(a) is a proton nuclear magnetic resonance ($^1$H-NMR) spectrum of the styrene copolymer (not cross-linked) obtained in (2) of Example 1.
Figure 1:
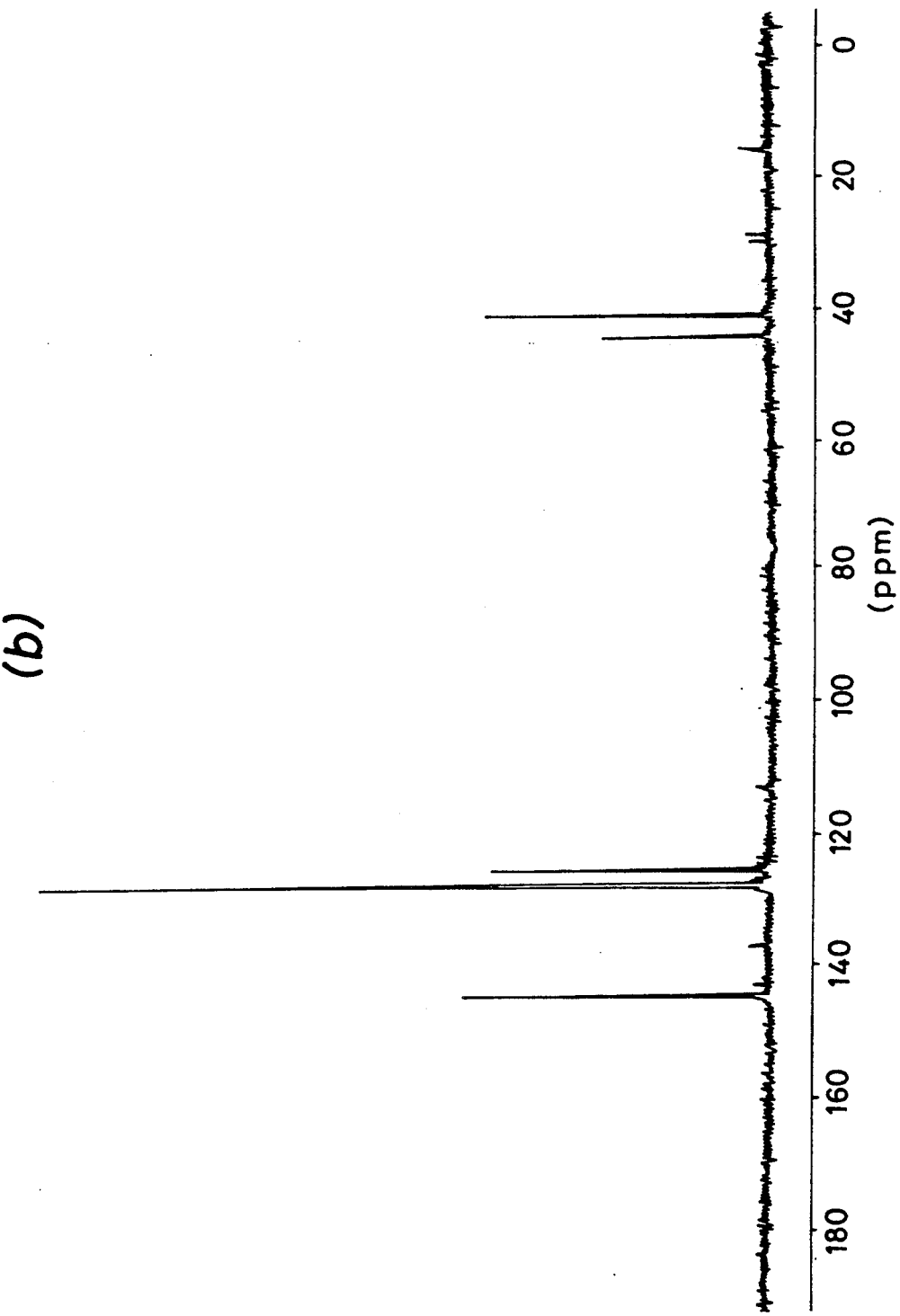
FIG. 1(b) is a $^{13}$C-NMR spectrum of the styrene copolymer (not cross-linked) obtained in (2) of Example 1.

The styrene copolymers of the present invention, as described above, comprise the repeating units (I) and (II). The repeating unit (I) is represented by the general formula (a). In the general formula (a), $R^1$ is a hydrogen atom; a halogen atom (e.g., chlorine, bromine and iodine); or a carbon, oxygen, nitrogen, sulfur, phosphorus or silicon atom-containing group; and m is an integer of 1 to 3.

Specific examples of the repeating unit (I) are: a styrene unit; an alkylstyrene unit, e.g., a p-methylstyrene unit, a m-methylstyrene unit, an o-methylstyrene unit, a 2,4-dimethylstyrene unit, a 2,5-dimethylstyrene unit, a 3,4-dimethylstyrene unit, a 3,5-dimethylstyrene unit, a p-ethylstyrene unit, a m-ethylstyrene unit and a p-tert-butylstyrene unit; a halogenated styrene unit, e.g., a p-chlorostyrene unit, a m-chlorostyrene unit, an o-chlorostyrene unit, a p-bromostyrene unit, a m-bromostyrene unit, an o-bromostyrene unit, a p-fluorostyrene unit, a m-fluorostyrene unit, an o-fluorostyrene unit, and an o-methyl-p-fluorostyrene unit; an alkoxystyrene unit, e.g., a p-methoxystyrene unit, a m-methoxystyrene unit, an o-methoxystyrene unit, a p-ethoxystyrene unit, a m-ethoxystyrene unit, and an o-ethoxystyrene unit; a carboxyesterstyrene unit, e.g., a p-carboxymethylstyrene unit, a m-carboxymethylstyrene unit, and an o-carboxymethylstyrene unit; an alkyletherstyrene unit, e.g., a p-vinylbenzylpropyl ether unit; an alkylsilylstyrene unit, e.g., a p-trimethylsilylstyrene unit; a vinylbenzeneethyl sulfonate unit; a vinylbenzyldimethoxy phosphite unit; and units comprising two or more of the above units.

The repeating unit (II) is represented by the general formula (b). In the general formula (b), $R^2$ is an unsaturated hydrocarbon group containing a terminal vinyl group and having 2 to 10 carbon atoms, such as a vinyl group, an allyl group, a methallyl group, a homoallyl group, a pentenyl group, a decenyl group and the like, and n is an integer of 1 or 2. Specific examples of the repeating unit (II) are a p-divinylbenzene unit, a m-divinylbenzene unit, a trivinylbenzene unit, a p-allylstyrene unit, a m-allylstyrene unit, a methallylstyrene unit, a homoallylstyrene unit, a pentenylstyrene unit, a decenylstyrene unit, and units comprising two or more thereof.

The proportion of the repeating unit (II) is not critical in the styrene-based copolymers of the present invention. It is usually from 0.1 to 50 mol % based on the copolymer, with the range of 1 to 15 mol % being preferred. Although the molecular weight of the copolymer is not critical, those having a weight average molecular weight (Mw) of 10,000 to 3,000,000, preferably 50,000 to 1,000,000 are suitably used.

The styrene copolymers (including cross-linked styrene copolymers) of the present invention have mainly a syndiotactic configuration (specifically a cosyndiotactic configuration), that is, a stereo structure in which phenyl groups or substituted phenyl groups as side chains of the copolymer are located alternately in opposite positions relative to the copolymer main chain comprising carbon-carbon bonds. The syndiotacticity is quantitatively determined by the nuclear magnetic resonance method (NMR method). More specifically, tacticity is determined by analyzing aromatic ring $C_1$ carbon signals and methine-methylene carbon signals as measured by $^{13}$C-NMR (NMR spectrum using carbon isotope), or proton signals measured by $^1$H-NMR. The tacticity determined by the NMR method is indicated in terms of proportions of a plurality of repeating units continuously connected to one another, i.e., diad in which two repeating units are connected to each other, triad in which three repeating units are connected to one another, and pentad in which five repeating units are connected to one another.

The styrene copolymers (including cross-linked styrene copolymers) of the present invention generally have a syndiotactic structure with a proportion of at least 75%, preferably at least 85% in diad, or at least 30%, preferably at least 50% in pentad. The degree of syndiotacticity varies somewhat with the type of the substituent, the proportion of the repeating unit (II), and so on.

In the styrene copolymers (including cross-linked styrene copolymers) of the present invention, a syndiotactic arrangement (cosyndiotactic arrangement) exists not only between repeating units (I) and (I), and repeating units (II) and (II), but also between repeating units (I) and (II).

The styrene polymers of the present invention may be block copolymers, random copolymers, alternating copolymers, etc., having repeating units (I) and (II).

The styrene copolymers of the present invention include mixtures of the above specified styrene copolymers and a small amount of isotactic or atactic styrene polymers or copolymers, and styrene copolymers in which a small amount of isotactic or atactic styrene polymers or copolymers are incorporated in the above specified styrene copolymers.

The styrene copolymer (not cross-linked) having the desired stereoregularity and reactive substituent can be provided by copolymerizing monomers corresponding to the repeating units (I) and (II), or fractionating or blending the styrene copolymers obtained, or applying organic synthesis techniques.

The cross-linked styrene copolymer of the present invention can be obtained by cross-linking the above styrene copolymers having mainly a syndiotactic configuration. The cross-linked styrene copolymers are formed by cross-linking of the reactive substituent contained in the repeating unit (II). During the cross-linking reaction, the micro structure of the styrene copolymers remains unchanged and thus, even after the cross-linking reaction, the syndiotactic configuration is maintained.

The styrene copolymers (including cross-linked styrene copolymers) of the present invention can be produced by various methods. The process of the present invention permits the production of high quality styrene copolymers with greater efficiency.

In the process of the present invention, the styrene-based monomer (I) represented by the general formula (a') and the styrene-based monomer (II) represented by the general formula (b') are used as the starting materials. The styrene-based monomers (I) and (II), when copolymerized, constitute the repeating units (I) and (II), respectively. Thus, monomers corresponding to the specific examples of repeating units (I) and (II) as described above can be given as specific examples of the styrene-based monomers (I) and (II).

In accordance with the process of the present invention, the styrene-based monomers (I) and (II) are copolymerized in the presence of a catalyst containing (A) titanium compound and (B) aluminoxane as the main components.

Various titanium compounds can be used as component (A) of the catalyst. Titanium compounds and titanium chelate compounds represented by the general formula (III) or (IV) are preferably used:

  (III) or

  (IV)

wherein $R^3$, $R^4$, $R^5$ and $R^6$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, or a halogen atom, a, b and c are each an integer of 0 to 4, and d and e are each an inteter of 0 to 3.

$R^3$, $R^4$, $R^5$ and $R^6$ of the general formula (III) or (IV) are each a hydrogen atom, an alkyl group having 1 to 20 carbon atoms (specifically a methyl group, an ethyl group, a propyl group, a butyl group, an amyl group, an isoamyl group, an isobutyl group, an octyl group, a 2-ethylhexyl group and the like), an alkoxy group having 1 to 20 carbon atoms (specifically a methoxy group, an ethoxy group, a propoxy group, a butoxy group, an amyloxy group, a hexyloxy group, a 2-ethylhexyloxy group, and the like), an aryl group having 6 to 20 carbon atoms, an alkylaryl group, an arylalkyl group (specifically a phenyl group, a tolyl group, a xylyl group, a benzyl group and the like), an acyloxy group having 1 to 20 carbon atoms (specifically a heptadecylcarbonyloxy group and the like), a cyclopentadienyl group, a substituted cyclopentadienyl group (specifically a methylcyclopentadienyl group, a 1,2-dimethylcyclopentadienyl group, a pentamethylcyclopentadienyl group and the like), an indenyl group or a halogen atom, (e.g., chlorine, bromine, iodiene and fluorine). $R^3$, $R^4$, $R^5$ and $R^6$ may be the same or different.

a, b and c are each an integer of 0 to 4, and d and e are each an integer of 0 to 3.

Specific examples of the tetravalent titanium compounds and titanium chelate compounds represented by the general formula (III) are methyltitanium trichloride, titanium tetramethoxide, titanium tetraethoxide, titaniummonoisopropoxy trichloride, titaniumdiisopropoxy dichloride, titaniumtriisopropoxy monochloride, tetra(2-ethylhexyloxy)titanium, cyclopentadienyltitanium trichloride, biscyclopentadienyltitanium dichloride, cyclopentadienyltitanium trimethoxide, cyclopentadienyl trimethyltitanium, pentamethylcyclopentadienyltitanium trimethoxide, pentamethylcyclopentadienyl trimethyltitanium, titanium tetrachloride, titanium tetrabromide, bis(2,4-pentanedionate)titanium oxide, bis(2,4-pentanedionate)titanium dichloride, bis(2,4-pentanedionate)titanium dibutoxide, and the like. In addition, as the titanium compound of component (A), condensed titanium compounds represented by the general formula (V):

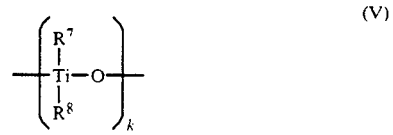

(wherein $R^7$ and $R^8$ are each a halogen atom, an alkoxy group having 1 to 20 carbon atoms, or an acyloxy group, and k is 2 to 20) may be used.

These titanium compounds may be used in the form of complexes with esters, ethers and the like.

Typical examples of the trivalent titanium compounds represented by the general formula (IV) which are to be used as component (A) are titanium trihalide such as titanium trichloride and the like, and cyclopentadienyltitanium compounds such as cyclopentadienyltitanium dichloride and the like. In addition, trivalent titanium compounds as obtained by reducing tetravalent titanium compounds can be used. These trivalent titanium compounds may be used in the form of complexes with esters, ethers and the like.

Aluminoxanes which are to be used as component (B) of the catalyst of the present invention are specifically alkylaluminoxane represented by the general formula (VI):

(wherein $R^9$ is an alkyl group having 1 to 8 carbon atoms, and p is 2 to 50).

These alkylaluminoxanes can be prepared by various methods. For example, (1) a method in which alkylaluminum is dissolved in an organic solvent and then contacted with water, (2) a method in which alkylaluminum is first added at the time of polymerization and then water is added, and (3) a method in which alkylaluminum is reacted with water of crystallization as contained in metal salts and the like, or water adsorbed in inorganic or organic materials. The above water may contain ammonia, amines such as ethylamine and the like, sulfur compounds such as hydrogen sulfide and the like, or phosphorus compounds such as phosphorous acid esters and the like in the proportion of less than 20%.

The catalysts to be used in the process of the present invention contain components (A) and (B) as the main components. The catalyst may contain other catalyst components, for example, trialkylaluminum represented by the general formula; $AlR^{10}{}_3$ (wherein $R^{10}$ is an alkyl group having 1 to 8 carbon atoms), and other organometallic compounds, if necessary.

The ratio of component (A) to component (B) in the catalyst varies with the type of each catalyst component, the type of each of styrene-based monomer (I) of the general formula (a') and the styrene-based monomer (II) of the general formula (b') as the starting materials, and other conditions, and thus cannot be determined unconditionally. Usually, the molar ratio of aluminum contained in component (B) to titanium contained in component (A), i.e., aluminum/titanium is 1:1 to $1\times10^6:1$, with the range of 10:1 to $1\times10^4:1$ being preferred.

In accordance with the process of the present invention, the styrene-based monomers (I) and (II) are copolymerized in the presence of a catalyst containing components (A) and (B) as the main components. This copolymerization may be carried out in a bulk form, or in a solvent; e.g., aliphatic hydrocarbons such as pentane, hexane, heptane and the like, alicyclic hydrocarbons such as cyclohexane and the like, or aromatic hydrocarbons such as benzene, toluene, xylene and the like.

Although the polymerization temperature is not critical, it is usually 0° to 90° C. and preferably 20° to 70° C.

The copolymerization reaction is carried out in the presence of hydrogen to effectively control the molecular weight of the styrene copolymer obtained.

The styrene copolymers obtained by the process of the present invention are of high syndiotacticity. High purity styrene copolymers having a markedly high syndiotacticity can be obtained by;(1) applying de-ashing treatment (removal of catalysts) with a cleaning solution containing, for example, hydrochloric acid after polymerization,(2) washing the styrene copolymers with water and drying under reduced pressure to remove a soluble content,(3)further washing with a solvent, e.g., methyl ethyl ketone and (4) treating the insoluble content with chloroform, for example.

Cross-linked styrene copolymers of the present invention can be produced by cross-linking the styrene copolymers as obtained above. The styrene copolymers (before cross-linking) have a reactive substituent linked to the repeating unit (II). Thus, upon addition of a suitable initiator (e.g., a cross-linking agent, a cross-linking auxiliary, a light sensitizer, and the like), or application of energy (irradiation by active energy rays such as X-ray, ultraviolet ray, visible light ray, electron ray, γ-ray and the like, or heating), cross-linking proceeds easily and the desired cross-linked styrene copolymers can be obtained.

The micro structure of the styrene copolymer remains unchanged and the same syndiotactic configuration as before cross-linking is maintained in the cross-linking treatment as described above.

The present invention is described in greater detail with reference to the following examples.

EXAMPLE 1

(1) (B) Preparation of Aluminoxane

Two hundred ml of toluene was placed in a reactor, and 47.4 ml (492 millimoles) of trimethylaluminum and 35.5 g (142 millimoles) of copper sulfate 5-hydrate (CuSO$_4$.5H$_2$O) were added and reacted in a stream of argon at 20° C. for 24 hours.

The copper sulfate was removed from the reaction mixture by filtration and the toluene was distilled away to obtain 12.4 g of methylaluminoxane. The molecular weight (measured by the cryoscopic method using benzene) of the methylalumonoxane was 721.

(2) Production of Styrene-Divinyl Benzene Copolymer

A hundred and eighty ml of toluene and 1.5 millimoles (as aluminum atom)of the methylaluminoxane obtained in (1) above were placed in a 1.4-liter reactor equipped with a stirrer, and then 0.15 millimole of tetraethoxytitanium was added. The resulting mixture was heated. At 50° C., a mixture of 142.5 ml of styrene and 7.5 ml of a divinylbenzene-containing monomer consisting of a mixture of 66.1% by weight . of divinylbenzene (mixture of m- and p-substituted benzene) and 33.9% by weight of ethylstyrene (mixture of m- and p-ethylstyrene) was added and reacted for 2 hours. Then the reaction was stopped by adding methanol. Then a mixture of hydrochloric acid and methanol was added to decompose the catalyst component.

The amount of the styrene copolymer obtained above was 42.8 g. The styrene copolymer was washed with methyl ethyl ketone (containing 2% by weight of p-tert-butylcatechol) at 50° C. for 2 hours, and the insoluble content was 99%. The methyl ethyl ketone-insoluble styrene copolymer was dissolved in chloroform to obtain a solution of the styrene copolymer in chloroform. The styrene copolymer soluble in chloroform had a weight average molecular weight of 360,000, a number average molecular weight of 110,000 and a melting point of 240° C.

A thermal analysis using a differential scanning calorimeter (DSC), a structural analysis using an infrared spectroscopic analysis (IR) and a nuclear magnetic resonance (NMR) analysis were made to show that the styrene copolymer obtained above was a heat-sensitive styrene copolymer having the syndiotactic configuration.

(a) DSC Analysis

The styrene copolymer was found to have a melting point at 240° C. in the first heating. In the DSC chart, an exothermal peak which was considered due to a thermal reaction was observed below or above the melting point shown in the first heating.

(b) IR Analysis

In the IR spectrum of the styrene copolymer, a peak assigned to the double bond remaining in the polymerization site of the divinylbenzene was observed at 1620 cm$^{-1}$. The styrene copolymer was heated at 230° C. for 20 minutes. An IR analysis of the heated styrene copolymer showed that the peak assigned to the above double bond at 1620 cm$^{-1}$ disappeared. This indicates that the double bond portion entirely underwent cross-linking by the heat treatment.

(c) NMR Analysis

(1) $^1$H-NMR

A $^1$H-NMR spectrum of the styrene copolymer is shown in FIG. 1(a). Peak assignments are shown below.

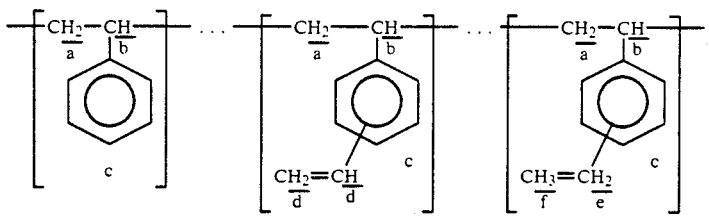

a: 1.30 ppm, b: 1.81 ppm, c: 6.55, 7.06 ppm,
d: 5.18 ppm, e: 2.45 ppm, f: 1.09 ppm The methylene and methine signals confirmed that the stereoregularity of the styrene copolymer was syndiotactic. The composition of the styrene copolymer as calculated based on the peaks was as follows: styrene unit, 85.6 mol %; divinylbenzene unit, 9.4 mol %; ethylstyrene unit, 5.0 mol).

(2) $^{13}$C-NMR

A $^{13}$C-NMR spectrum of the styrene copolymer is shown in FIG. 1(b). Aromatic ring $C_1$ carbon signals were observed at 145.1 ppm, 144.9 ppm and 142.3 ppm. These signals confirmed that the stereoregularity of the styrene copolymer was syndiotactic.

The above analytical results confirmed that the styrene copolymer was a heat-sensitive copolymer comprising a syndiotactic chain.

(3) Production of Cross-Linked Styrene Copolymer

The styrene copolymer obtained in (2) above was dissolved in chloroform to prepare a 1% by weight chloroform solution of the styrene copolymer. The chloroform solution was cast to form a cast film, and the cast film was then heated at 230° C. for 20 minutes. Observation of an IR spectrum of the cast film before and after the above heat treatment showed that the peak at 1620 cm$^{-1}$ as assigned to the aromatic ring substituted double bond completely disappeared. This confirmed that the residual vinyl group contained in a proportion of 9.4 mol % underwent the cross-linking reaction. For the styrene copolymer after the heat treatment (cross-linked styrene copolymer), the weight average molecular weight was 4,500,000 and the number average molecular weight was 1,250,000, and the melting point was not observed up to 300° C. The kinematic modulus of elasticity at room temperature of the cast film was 3.34×10$^{10}$ dyne/cm$^2$, which barely changed up to 250° C.

EXAMPLE 2

A styrene copolymer was produced in the same manner as in (2) of Example 1 except that a mixture of 135 ml of styrene and 15 ml of a divinylbenzene-containing monomer was added. The amount of the styrene copolymer obtained was 35 g. Thereafter, the same tretment as in (2) of Example 1 was applied. The chloroform-soluble portion had a weight average molecular weight of 390,000, a number average molecular weight of 140,000 and a melting point of 213° C.

A $^1$H-NMR spectrum of the styrene copolymer is shown in FIG. 2. The composition of the styrene copolymer as calculated from the peaks of the spectrum was as follows: styrene unit: 82.2 mol %; divinylbenzene unit: 13.0 mol %; ethylstyrene unit: 4.8 mol %.

A cast film was produced from the styrene copolymer in the same manner as in (3) of Example 1. Upon heat treatment of the cast film at 230° C. for 20 minutes, all the residual aromatic ring substituent double bonds were cross-linked. The weight average molecular weight was 6,700,000, the number average molecular weight was 2,370,000, and the melting point was not observed up to 300° C. The kinematic modulus of elasticity at room temperature of the cast film was 3.55×10$^{10}$ dyne/cm$^2$, which did not almost change up to 250° C.

COMPARATIVE EXAMPLE 1

Sixty ml of toluene, 47.5 ml of styrene and 2.5 ml of a divinylbenzene-containing monomer (consisting of 66.1% by weight of divinylbenzene and 33.9% by weight of ethylstyrene) were placed in a 0.5-liter reactor equipped with a stirrer, and then radical polymerization was carried out at 60° C. for 12 hours by the use of azobisisobutyronitrile as an initiator. Thereafter, the same procedure as in (2) of Example 1 was applied to obtain a styrene-divinylbenzene copolymer which was soluble in chloroform and had the atactic configuration. The styrene copolymer had a weight average molecular weight of 70,000 and a number average molecular weight of 39,000, but did not have a melting point.

COMPARATIVE EXAMPLE 2

(1) Production of Syndiotactic Polystyrene

A hundred ml of toluene and 40 millimoles (as aluminum atom) of the methylaluminoxane obtained in (1) of Example 1 were placed in a 0.5-liter glass container equipped with a stirrer, and then 0.05 millimole of cyclopentadienyltitanium trichloride was added. Subsequently, at 20° C., 180 ml of styrene was added and polymerized for one hour, and then methanol was injected to terminate the reaction. After that a mixture of hydrochloric acid and methanol was added to decompose the catalyst component.

The amount of the polystyrene (syndiotactic polystyrene) obtained was 16.5 g. The polystyrene had a weight average molecular weight of 280,000 and a number average molecular weight of 57,000. The polystyrene was extracted with methyl ethyl ketone as a solvent for 4 hours in a Soxhlet extraction apparatus, and the methyl ethyl ketone-insoluble content was 97% by weight. The methyl ethyl ketone-insoluble polystyrene had a melting point of 260° C.

(2) Mechanical Properties of Syndiotactic Polystyrene

A 1% by weight solution of the syndiotactic polystyrene obtained in (1) above in chloroform was cast to form a cast film. The kinematic modulus of elasticity at room temperature of the cast film was 1.94×10$^{10}$ dyne/cm$^2$. On the other hand, the kinematic modulus of elasticity at room temperature of the case film which has been heated at 230° C. for 20 minutes was $2.7 \times 10^{10}$ dyne/cm$^2$.

COMPARATIVE EXAMPLE 3

A cast film was produced in the same manner as in (3) of Example 1 from the styrene-divinylbenzene copolymer obtained in Comparative Example 1. The cast film was then heated at 150° C. The kinematic modulus of elasticity of the heated cast film at room temperature was $2.9 \times 10^{10}$ dyne/cm$^2$, but abruptly dropped when heated at a temperature in excess of 160° C.

INDUSTRIAL APPLICABILITY

The styrene copolymers of the present invention are reactive resins (heat-sensitive resins and radiation-sensitive resins) having a syndiotactic configuration and are excellent in heat resistance and chemical resistance as compared with the conventional reactive resins. The styrene copolymers of the present invention, when heated, provide cross-linked products which can be used as base materials for ion exchange resins, and furthermore are effective as base materials for use in the production of functional polymers (e.g., polymer catalysts) by bonding various compounds to the vinyl group as the side chain.

The cross-linked styrene copolymers of the present invention are cross-linked resins having a syndiotactic configuration and are excellent in heat resistance, chemical resistance and mechanical strength as compared with the conventional cross-linked resins. Thus the cross-linked styrene copolymers of the present invention can be widely and effectively used as base materials for ion exchange resins and functional polymers (e.g., polymer catalysts and the like), and further as various construction materials and so on.

We claim:

1. A styrene copolymer having a repeating unit (I) represented by the formula:

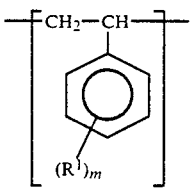

wherein R$^1$ is a hydrogen atom; a halogen atom; or an alkyl group having 1–4 carbon atoms, at the meta- and/or para-position of repeating unit (I); m is an integer of 1 to 3; and when m is plural, R$^1$s may be the same or different;

0.1 to 50 mol. % based on the copolymer, of a repeating unit (II) represented by the formula:

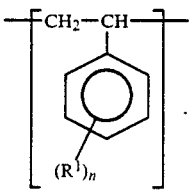

wherein R$^2$ is an unsaturated hydrocarbon group containing a terminal vinyl group and having 2 to 10 carbon atoms, n is an integer of 1 or 2, and when n is 2, R$^2$s may be the same or different; and the syndiotacticity of said copolymer is at least 30% in pentads.

2. A cross-linked styrene copolymer obtained by cross-linking the styrene copolymer of claim 1.

3. A process for producing the styrene copolymer of claim 1 which comprises copolymerizing a styrene-based monomer (I) represented by the formula:

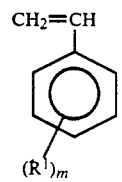

wherein R$^1$ and m are the same as defined above and a styrene-based monomer (II) represented by the formula:

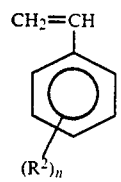

wherein R$^2$ and n are the same as defined above in the presence of a catalyst containing (A) a titanium compound and (B) an aluminoxane as main components.

4. The styrene copolymer as claimed in claim 1 wherein repeating unit (I) is one or more units selected from the group consisting of a styrene unit, a p-methylstyrene unit, a m-methylstyrene unit, a 3,4-dimethylstyrene unit, a 3,5-dimethylstyrene unit, a p-ethylstyrene unit, a m-ethylstyrene unit, a p-tert-butylstyrene unit, a p-chlorostyrene unit, a m-chlorostyrene unit, a p-bromostyrene unit, a m-bromostyrene unit, a p-fluorostyrene unit, and a m-fluorostyrene unit.

5. The styrene copolymer as claimed in claim 1 wherein repeating unit (II) is one or more units selected from the group consisting of a p-divinylbenzene unit, a m-divinylbenzene unit, a trivinylbenzene unit, a p-allylstyrene unit, a m-allylstyrene unit, a methallylstyrene unit, a homoallylstyrene unit, a pentenylstyrene unit, and a decenylstyrene unit.

6. The cross-linked styrene copolymer as claimed in claim 2 wherein repeating unit (I) is one or more units selected from the group consisting of a styrene unit, a p-methylstyrene unit, a m-methylstyrene unit, a 3,4-dimethylstyrene unit, a 3,5-dimethylstyrene unit, a p-ethylstyrene unit, a m-ethylstyrene unit, a p-tert-butylstyrene unit, a p-chlorostyrene unit, a m-chlorostyrene unit, a p-bromostyrene unit, a m-bromostyrene unit, a p-fluorostyrene unit, and a m-fluorostyrene unit.

7. The cross-linked styrene copolymer as claimed in claim 2 wherein repeating unit (II) is one or more units selected from the group consisting of a p-divinylbenzene unit, a m-divinylbenzene unit, a trivinylbenzene unit, a p-allylstyrene unit, a m-allylstyrene unit, a methallylstyrene unit, a homoallylstyrene unit, a pentenylstyrene unit, and a decenylstyrene unit.

8. A process for producing the styrene copolymer of claim 2 which comprises copolymerizing a styrene-based monomer (I) represented by the formula:

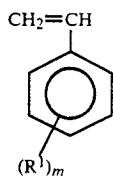

wherein $R^1$ and m are the same as defined above and a styrene-based monomer (II) represented by the formula:

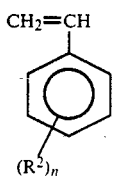

wherein $R^2$ and n are the same as defined above in the presence of a catalyst containing (A) a titanium compound and (b) an aluminoxane as main components to form a styrene copolymer and, thereafter, crosslinking the styrene copolymer.

9. The process as claimed in claim 3 or 8 wherein (A) titanium compound is one or more compounds represented by the general formula (III) or (IV):

$$TiR^3_a R^4_b R^5_c R^6_{4-(a+b+c)} \quad (III)$$

$$TiR^3_d R^4_e R^5_{3-(d+e)} \quad (IV)$$

wherein $R^3$, $R^4$, $R^5$ and $R^6$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, or a halogen atom, a, b and c are each an integer of 0 to 4, and d and e are each an integer of 0 to 3.

10. The process as claimed in claim 3 or 8 wherein (B) aluminoxane is alkylaluminoxane represented by the general formula (VI):

(wherein $R^9$ is an alkyl group having 1 to 8 carbon atoms, and p is 2 to 50).

11. The styrene copolymer as claimed in claim 4 wherein repeating unit (II) is one or more units selected from the group consisting of a p-divinylbenzene unit, a m-divinylbenzene unit, a trivinylbenzene unit, a p-allylstyrene unit, a m-allylstyrene unit, a methallylstyrene unit, a homoallylstyrene unit, a pentenylstyrene unit, and a decenylstyrene unit.

12. The cross-linked styrene copolymer as claimed in claim 6 wherein repeating unit (II) is one or more units selected from the group consisting of a p-divinylbenzene unit, a m-divinylbenzene unit, a trivinylbenzene unit, a p-allylstyrene unit, a m-allylstyrene unit, a methallylstyrene unit, a homoallylstyrene unit, a pentenylstyrene unit, and a decenylstyrene unit.

13. The process as claimed in claim 9 wherein (B) aluminoxane is alkylaluminoxane represented by the general formula (VI):

(wherein $R^9$ is an alkyl group having 1 to 8 carbon atoms, and p is 2 to 50).

14. The styrene copolymer of claim 1 wherein the repeating unit (II) is present in an amount of 1 to 15 mol % based on the copolymer.

15. The styrene copolymer of claim 1 having an average molecular weight of 10,000 to 3,000,000.

16. The styrene copolymer of claim 15 having an average molecular weight of 50,000 to 1,000,000.

17. The styrene copolymer of claim 1 wherein the syndiotacticity is at least 50% in the pentad.

18. The styrene copolymer of claim 17 which is a styrene-divinyl benzene copolymer.

* * * * *

UNITED STATES PATENT AND TRADEMARK OFFICE
CERTIFICATE OF CORRECTION

PATENT NO. : 5,202,402
DATED : April 13, 1993
INVENTOR(S) : Keisuke Funaki et al.

It is certified that error appears in the above-identified patent and that said Letters Patent is hereby corrected as shown below:

On the title page, Item [30],

The PCT information has been omitted from the Foreign Application

Priority Data, please insert:--Oct. 5, 1988 [PCT] PCT.....PCT/JP88/01013--

Signed and Sealed this

Twenty-eighth Day of December, 1993

Attest:

BRUCE LEHMAN

*Attesting Officer*     *Commissioner of Patents and Trademarks*